United States Patent
Lawson

[15] 3,651,828
[45] Mar. 28, 1972

[54] HYDRAULIC BRAKE CONTROL VALVES

[72] Inventor: Thomas G. Lawson, Kings Road Tyseley, Birmingham, England

[73] Assignee: Girling Limited
[22] Filed: Dec. 31, 1969
[21] Appl. No.: 889,763

[30] Foreign Application Priority Data

Jan. 2, 1969 Great Britain..........................378/69

[52] U.S. Cl.................................................137/351
[51] Int. Cl..................................................B66f 9/06
[58] Field of Search.............................137/351; 280/124 F

[56] References Cited

UNITED STATES PATENTS

| | | | |
|---|---|---|---|
| 2,916,284 | 12/1959 | Bertsch et al. | 280/124 F |
| 2,962,297 | 11/1960 | Cislo | 280/124 F |
| 3,026,125 | 3/1962 | Vogel | 280/124 F |
| 3,054,425 | 9/1962 | Pribonic | 280/124 F |
| 3,253,840 | 5/1966 | Granning | 280/124 F |
| 3,258,258 | 6/1966 | Hanna | 280/124 F |
| 3,481,361 | 12/1969 | Brewer et al. | 137/351 |

Primary Examiner—Samuel Scott
Attorney—Scrivener, Parker, Scrivener and Clarke

[57] ABSTRACT

The invention is an improvement in vehicle brake pressure control means of the type in which a brake pressure control valve is subject to the action of a spring load, varying with changing vehicle loading conditions, which modifies the operating characteristics (pressure reducing, pressure increasing or pressure limiting) of the valve. A coil torsion spring has opposed arms, one of which is connected to an unsprung vehicle part and the other to the sprung part. The latter arm is pivotally connected to a mounting bracket by means of a clamping member which holds the arm in rocking engagement with a fixed fulcrum.

8 Claims, 9 Drawing Figures

HYDRAULIC BRAKE CONTROL VALVES

The complete specification of our copending patent application Ser. No. 13830/67 (Ser. No. 1172101 = French Pat. Specification No. 1,529,694) describes and claims brake pressure control means for a vehicle having a sprung part and an unsprung part, comprising a pressure control valve having a movable member whose loading determines the operating characteristics of the valve, means for mounting the valve on one of the said parts of the vehicle, and a control spring having a coil portion, one end of which acts on the movable member, and the other end of which is adapted to be connected to the other of the said vehicle parts in such a manner that, in use, variations in the loading of the vehicle effect relative angular displacement of the ends of the spring about the axis of the coil to vary the stress therein and the loading of the movable member.

In the above-mentioned specification, the spring has one end secured to a lever which is, in turn, journaled for rotation about a pivot pin carried by a mounting bracket for the control valve. In some operating conditions, however, a journal bearing of this type may become badly affected by corrosion and dirt, thus affecting the operating efficiency of the control means.

The present invention provides an improved form of pivotal connection, which may be produced cheaply, and which is less vulnerable in use to the effects of dirt and corrosion.

In accordance with the invention, there is provided vehicle brake pressure control means, for a vehicle having a sprung part and an unsprung part, comprising a pressure control valve having a movable member whose loading determines the operating characteristics of the valve, means for mounting the valve on one of the said parts of the vehicle, and a control spring having a coil portion, one end of which acts on the said movable member and the other end of which is adapted to be connected to the other of the said vehicle parts in such a manner that, in use, variations in the loading of the vehicle effect relative angular displacement of the ends of the spring about the axis of the coil to vary the stress therein and the loading of the movable member wherein the said one end of the spring is held by a clamping member against a fixed fulcrum about which the said one end of the spring can rock.

The fixed fulcrum may be formed by a fixed pivot pin and the clamping member may be secured to the spring, close to one end thereof, with the spring and clamping member engaging over the pivot pin from opposite sides thereof so as to form a pivotal connection with the pin. A particularly rugged and stable assembly can be achieved by forming the spring with spaced parallel limbs extending transversely to the pivot pin, with the clamping member bridging and secured to the said limbs.

In an alternative embodiment, the spring extends through an aperture in the mounting means and the clamping member acts to hold the spring against an edge of the aperture in a manner which allows the spring to rock about the said edge. Preferably, the end of the spring is formed with a loop which is engaged over a fixed tongue projecting into the aperture.

Three forms of brake control means in accordance with the invention will now be described, by way of example only, with reference to the accompanying drawings in which.

Figure 1:
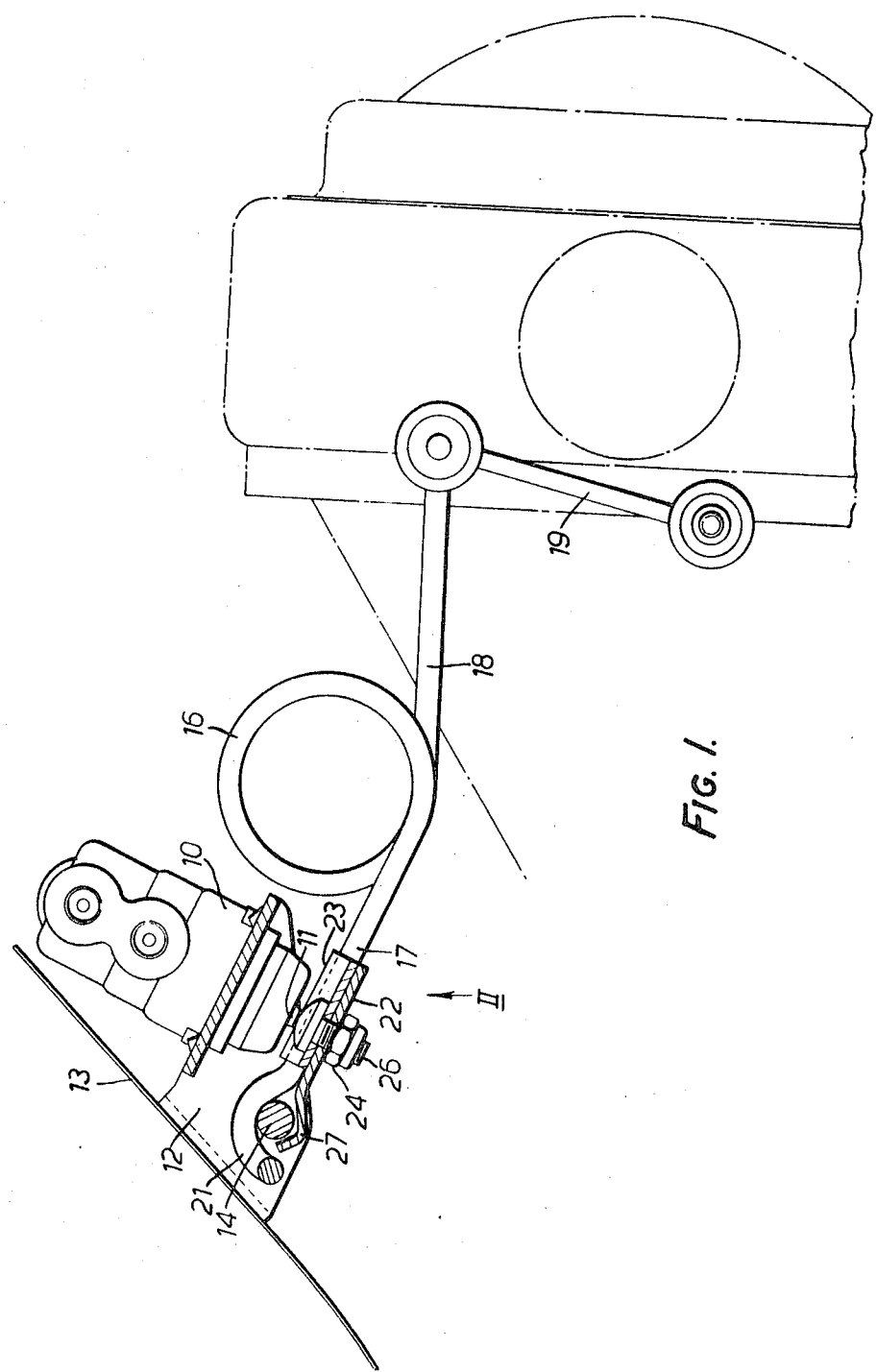
FIG. 1 is a part sectional elevation of one form of control means.
Figure 2:
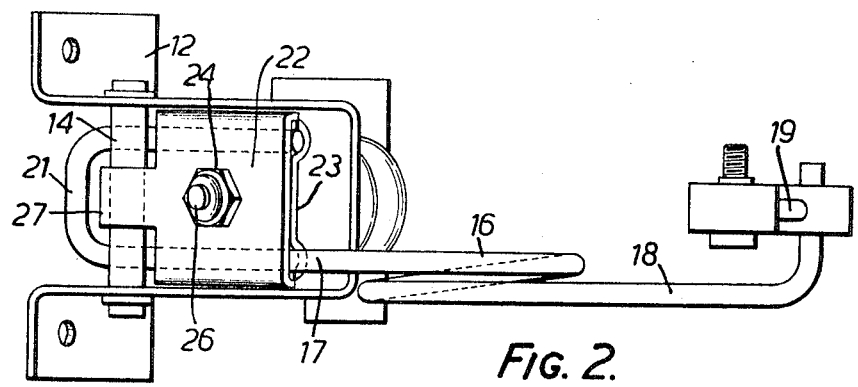
FIGS. 2 and 3 are bottom plan and end views respectively of the control means of FIG. 1.
Figure 3:
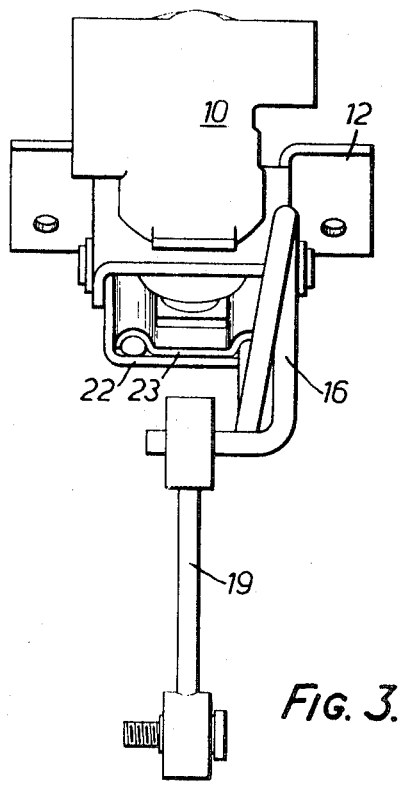

The brake control means shown in FIGS. 1, 2 and 3 comprises a brake pressure control valve 10 having a movable member 11 and securely fixed to a mounting bracket 12 shown mounted on a sprung vehicle part such as a chassis frame member 13. The bracket carries a fixed pivot pin 14. A control spring for controlling operation of the valve comprises a coil portion 16 and two arms 17 and 18 integral therewith. The extreme end of the arm 18 is pivotally connected by a shackle link 19 to an unsprung vehicle part, such as the rear axle casing.

The extreme outer end of the arm 17 is formed with an open, partial loop 21 which engages over the pivot pin 14. Secured to the arm close to that end is a clamping means formed by a pair of clamping plates 22, 23 secured together on opposite sides of the spring arm by a nut 24 and bolt 26. The plate 22 has an extension or lug 27 pressed into a partial, open loop of V-section the lug 27 and spring loop 21 being engaged over the pivot pin on opposite sides thereof so as to form a pivotal connection with the pin.

The outer end portion of the spring arm 17 and the clamping plates 22, 23 thus form a pivoted lever by means of which valve operating forces can be transmitted to the control valve. In this embodiment, the head of bolt 26 forms an abutment directly engaging the movable valve member 11.

Figure 4:
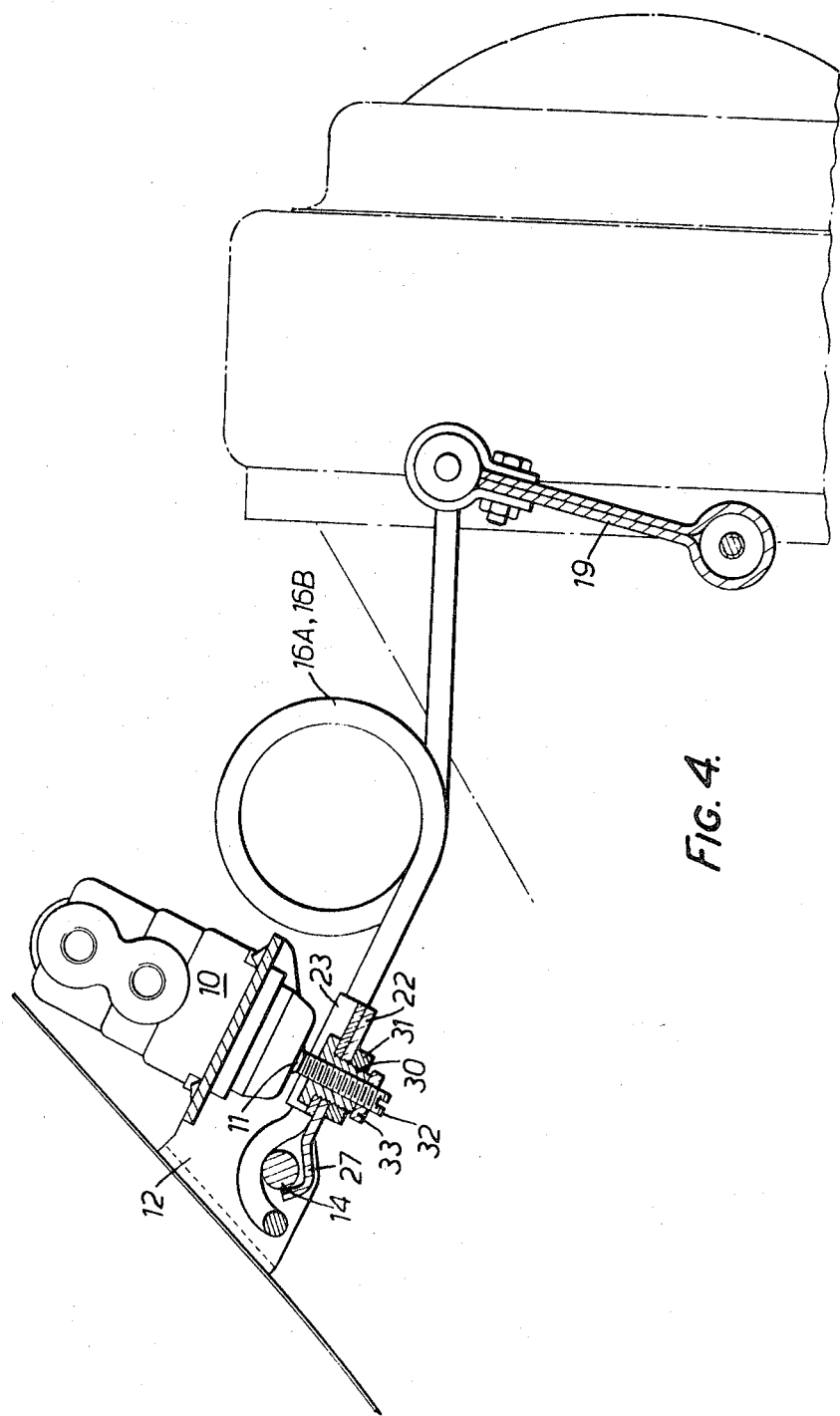
FIGS. 4, 5 and 6 are similar views of the second form of control means.
Figure 5:
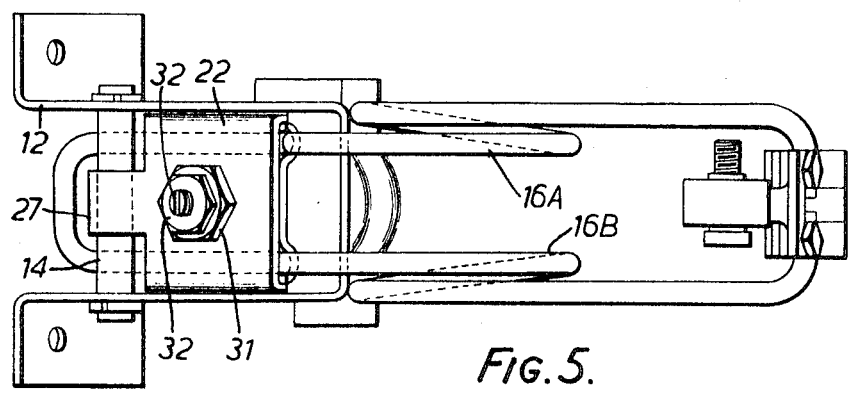
Figure 6:
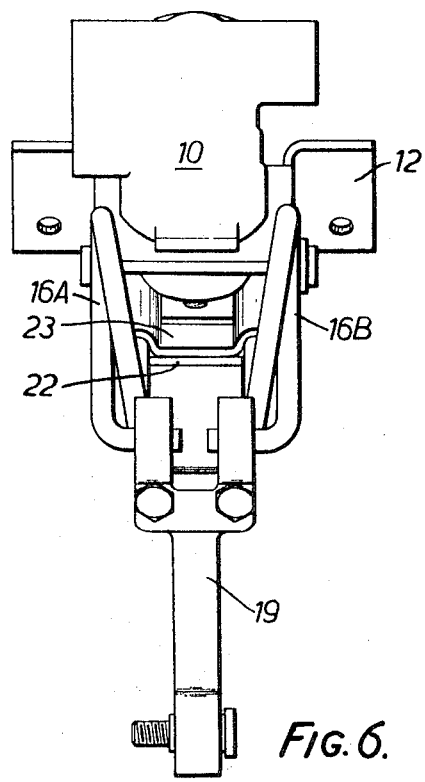

The control means shown in FIGS. 4, 5 and 6 is generally similar, except that the control spring is formed in two sections A and B side by side, with their respective coil portions 16A and 16B in register but spiralling in opposite directions. The two sections are preferably (and as shown) formed from a single length of wire, but could be separate if desired. Also, the clamping means in this embodiment incorporates an adjustable abutment for engaging the movable valve member 11. More particularly, the clamping plates 22, 23 are connected together by an internally and externally screw threaded, headed bush 30, which receives a nut 31. A grub screw 32 is received through the bush, one end engaging the valve member 11, and the other being received in a lock nut 33. Axial adjustment of the grub screw, along the line of action of the movable valve member 11, enables the initial spring load applied to the movable valve member to be varied.

In both embodiments described above, the pivotal connection of the control spring to the mounting bracket is achieved with a very simple assembly which is cheap to manufacture. The clamping plates 22, 23 are preferably formed as metal pressings, thereby avoiding the cost of a machined lever. Also, the nature of the pivotal connection is such that it is not greatly affected by corrosion and dirt. In each case, the control spring has, at its end, spaced parallel portions, both clamped between the clamping plates so as to produce a sturdy and stable assembly.

Figure 7:
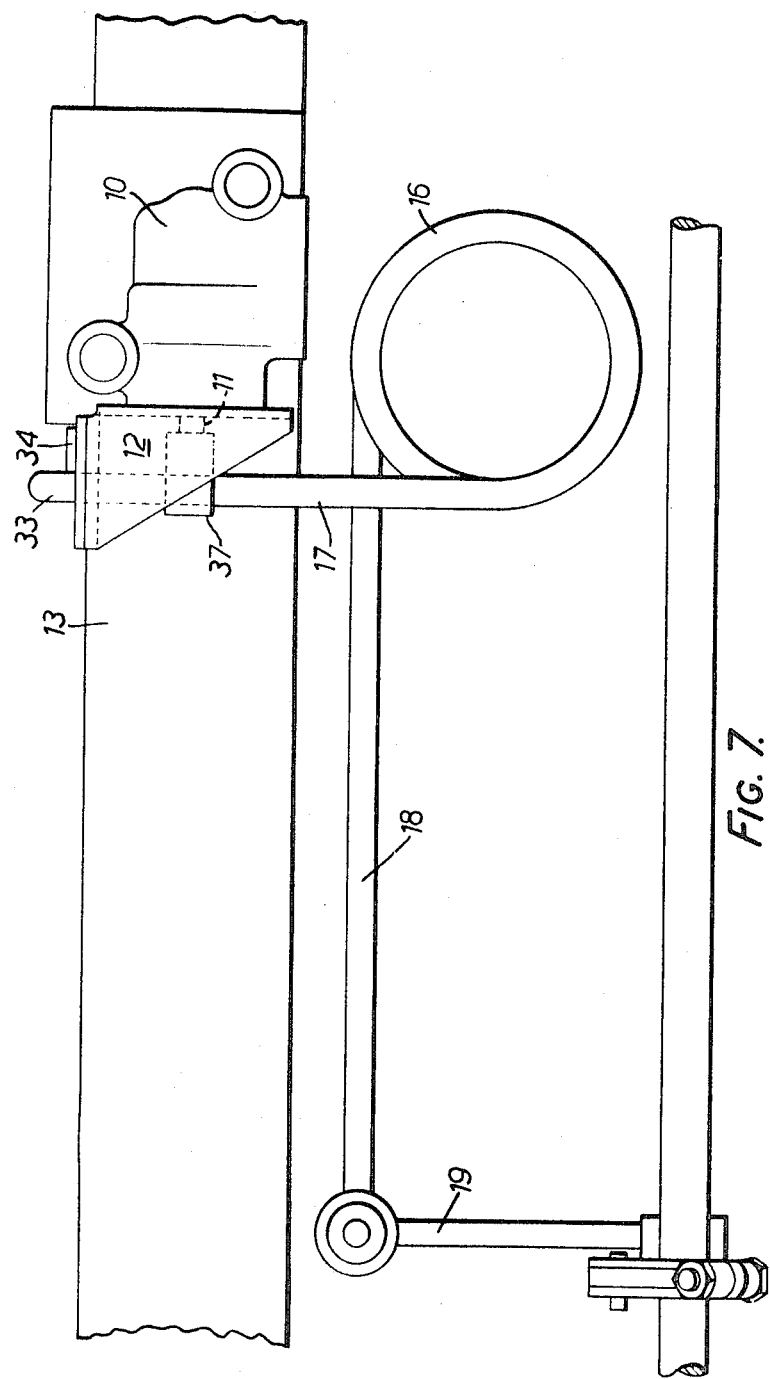
FIGS. 7, 8 and 9 are a side elevation, partial plan view and end elevation respectively of the third form of control means.
Figure 8:
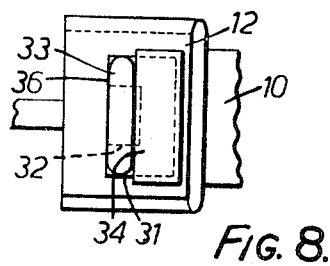
Figure 9:
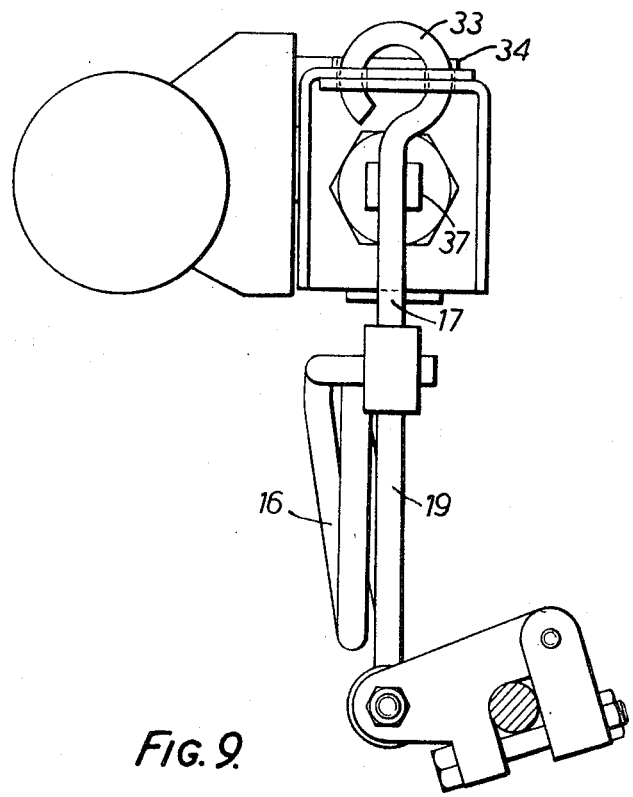

In the arrangement shown in FIGS. 7, 8 and 9, the mounting bracket 12 is formed with an aperture 31 having a projecting tongue 32. The adjacent end of the spring arm 17 is formed into a loop 33 which extends through the aperture and engages over the tongue, where it is retained by a clamping member in the form of a stop 34 of plastics or other resilient material wedged in between the spring loop 33 and one edge of the aperture. The stop 34 thus holds the spring against the opposite edge 36 of the aperture and this edge acts as a fixed fulcrum about which the spring arm 17 can rock. An intermediate portion of the spring arm 17 is received in a forked abutment 37 mounted on the movable valve member 11.

In each of the above-described embodiments, the arrangement is such that, in use, variations in vehicle loading which cause changes in the height of the sprung part of the vehicle relative to the unsprung part cause angular movements of the spring arm 18 about the axis of coil portion 16, to vary the stress in the coil portion and thus the force applied by the arm 17 to the valve member 11.

In this embodiment, also a reliable and sturdy pivotal connection is achieved without the use of machined levers, and the connection is not greatly affected by corrosion and dirt, since the relatively movable parts of the connection have substantially line contact only, and not full cylindrical surface contact as in a conventional bearing.

I claim:

1. In vehicle brake pressure control means, for a vehicle having a sprung part and an unsprung part, comprising a pressure control valve having a movable member whose loading determines the operating characteristics of the valve, means for mounting the valve on one of the said parts of the vehicle and a control spring having a coil portion, one end of which acts on the said movable member and the other end of which is adapted to be connected to the other of the said vehicle parts in such a manner that, in use, variations in the loading of the vehicle effect relative angular displacement of the ends of the spring about the axis of the coil to vary the stress therein and the loading of the movable member, the improvement which comprises a fixed fulcrum on said mounting means and a clamping member acting to hold said one end of said spring against said fulcrum for rocking motion about said fulcrum.

2. The improved control means of claim 1, wherein said fixed fulcrum is constituted by a fixed pivot pin carried by said mounting means, and said clamping member is secured to said spring close to one end thereof, said spring and clamping member being engaged over said pin from opposite sides thereof to form a pivotal connection therewith.

3. The improved control means of claim 2, wherein said spring is shaped to have spaced parallel limbs extending transversely to said pivot pin, and said clamping member bridges said limbs and is securely clamped thereto.

4. The improved control means of claim 2, wherein said spring and said clamping member are each formed with a partial open loop engaging over said pivot pin.

5. The improved control means of claim 2, comprising an abutment secured to said clamping member and spaced from said pivot pin for engagement with said movable member of said control valve.

6. The improved control means of claim 5, comprising means for adjusting said abutment, relative to said clamping member, along the line of action of said movable member.

7. The improved control means of claim 1, wherein said mounting means is shaped to define an aperture having an edge, said one end of said control spring extends through said aperture, and said clamping member is operative to hold said spring engaged against said edge, whereby said edge constitutes said fixed fulcrum.

8. The improved control means of claim 7, wherein said mounting means has a tongue projecting into said aperture from said edge and said edge and said one end of said spring is shaped to form a loop engaged over said tongue.

* * * * *